March 13, 1928.

G. F. COLBERT ET AL 1,662,565

NONGLARE MIRROR

Filed May 3, 1927

INVENTORS
George Fielding Colbert and
William Harry Colbert
By Green and McCallister
Plair Attorneys Patented Mar. 13, 1928.

1,662,565

UNITED STATES PATENT OFFICE.

GEORGE FIELDING COLBERT AND WILLIAM HARRY COLBERT, OF PITTSBURGH, PENNSYLVANIA.

NONGLARE MIRROR.

Application filed May 3, 1927. Serial No. 188,433.

Our present invention relates to improvements in the manufacture of the products which are described in our earlier applications, Serial Nos. 126,086 and 176,826, that were filed respectively on July 30th, 1926, and March 19th, 1927; and the general object of these improvements is to simplify shop procedure, and to substantially reduce the cost of producing non-glare mirrors of the character there described. Other more specific objects of our present invention will appear from the more detailed description which follows.

The general procedure which we follow in the production of our improved articles of manufacture is: to first subject a series of glass plates to optical examinations or tests for the purpose of determining their suitability for use as bases or supports for receiving the subsequently applied reflective coatings; to next subject the plates thus tested and selected to a cleansing process for removing from one side thereof all grease and other foreign matter which would interfere with, or impair, the deposit thereon of the desired mirror surfaces; and to then apply to this side only a film of a physically deposited metal sulphide which has a relatively high selective absorption for those portions of the spectrum to which the human eye is most sensitive.

Figure 1:
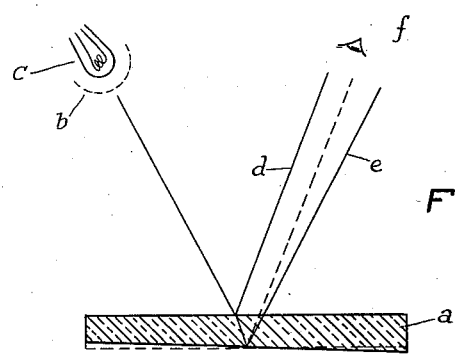
Figure 2:
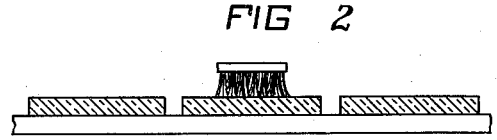
Figure 3:
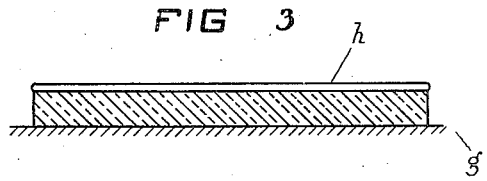

The main steps of this procedure are diagrammatically illustrated in the accompanying drawings, in which Figure 1 illustrates the manner in which the plates are first optically tested, Fig. 2 the general procedure which is followed in cleansing the treated sides of the selected plates; Fig. 3 one method of coating the cleansed sides of the said plates with the desired reflective film, and Fig. 4 and alternative method of likewise coating one side only of these plates.

In carrying out the first step of the operation we place each plate $a$ on a suitable support which is mounted below, or in front of, a suitable incandescent lamp $c$ and examine the image of the filament of this lamp as it is formed by reflection from the front and rear surfaces of the glass plate. In making this examination we also preferably make use of an orange-yellow screen $b$ which will not only generally reduce the intensity of the light from the incandescent filament, but will also tend to restrict the light to those portions of the spectrum which are least absorbed by our preferred non-glare mirror coating and which are, therefore, predominant in the images reflected therefrom. If the two opposite surfaces of the glass plate are inclined to each other at any sensible angle the light rays $d$ which are reflected from the front surface of the plate are correspondingly inclined to the rays $e$ which are reflected from the rear surface thereof; and the eye of the observer, at $f$, will see two distinct and separate images of the lamp filament. Plates which show such a dual image under these conditions are rejected as unsuitable for the manufacture of non-glare mirrors.

The plates which pass this test, i. e., the plates which do not show any sensible double image when so examined, are next placed on a suitable support and are thoroughly cleaned on their upper exposed sides by washing them with a dilute solution of a suitable alkali, and then thoroughly washing them with clean water; and in this cleansing process the plates are also preferably scoured or scrubbed with suitable brushes for the purpose of completely removing any foreign material which is not soluble in alkali and which tends to adhere to the glass surfaces.

Figure 4:
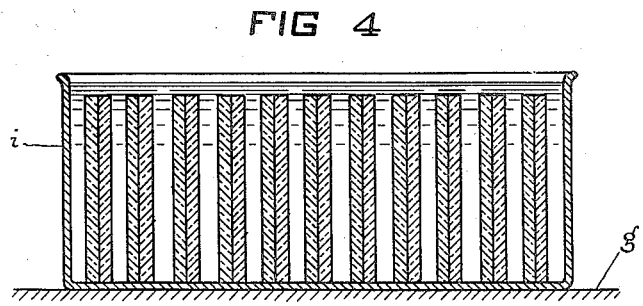

The plates after having been thus cleansed are coated on one side only with the desired reflective coating, and in carrying out this step of the process we may either follow the procedure indicated in Fig. 3 or the one indicated in Fig. 4. In following the procedure which is diagrammatically illustrated in Fig. 3 we transfer the plates from the support upon which they have been washed to a steam heated table $g$ which is preferably kept at a temperature of 95 degrees F.—as for instance by tipping the support on which the plates have been washed and thus causing them to slide by gravity from this support onto the surfaces of the table—and then pour upon each plate a thin layer of such a mixed solution as is hereinafter described. The liquid layer $h$, when so poured on the upper cleansed surface of the plate, is held thereon by surface tension until the desired action has been obtained. The plate is then removed from the heated table and washed and dried, after which the deposited coating of the exposed surfaces may be, if desired, covered with any suitable protective coating such as shellac and any of the well known lacquers.

In proceeding in the manner illustrated in Fig. 4 the cleaned plates are removed from the cleaning table and while still wet are placed together in pairs with the cleaned surfaces faced outwardly or away from each other. These pairs—which are held together by the surface tension of the water film between the contacting surfaces—are then placed on edge in a suitable vessel that is also supported on a heated table; and a sufficient quantity of our solution to completely cover the plates is poured into the containing vessel. In this case, as before, the exposed surfaces of each pair of plates are all very quickly covered with a deposited film of material; and when the operation is completed the plates are removed, separated from each other, washed and dried.

In the applications hereinbefore mentioned we have fully described the nature and composition of one solution which we have found to be admirably adapted for the rapid and uniform deposit of the film of lead sulphide on the glass surfaces. This solution comprises, generally stated, a mixture of one part of lead acetate in twenty-four parts of water, one and one-half parts of sodium hydroxide in twenty-four parts of water, and two parts of thiourea in ninety-six parts of water. Our present improvements relate in part to a modification of this mixture which consists in adding thereto from 10 to 30 parts of alcohol, so that our improved coating solution is of the following composition:

Lead acetate solution 24 parts, containing 1 part lead salt; sodium hydroxide 24 parts, containing 1.5 parts alkali; thiourea 96 parts, containing 2.0 parts thiourea; alcohol 10 to 30 parts.

We have found that the addition of alcohol in the above proportions has many important advantages. It permits us to use commercial thiourea which costs less than one dollar per pound, in place of chemically pure thiourea which we have heretofore employed and which costs betwen six and seven dollars per pound. We have found that the addition of alcohol to the mixed solutions appears to sensibly accelerate the reactions and to greatly facilitate the chemical precipitation of the lead sulphide—and to thus substantially reduce the time required for the completion of the deposits—and we have further ascertained that this addition tends to almost entirely prevent the formation of any suspended or undeposited particles of this material, so that at the end of the operation the solution becomes almost entirely clear, and there is no loose or unadherent material which must be removed by subsequent washing and cleaning. We also find that the deposits which are formed when alcohol is used are less affected by imperfect cleaning of the glass in the second step of the procedure; and the films obtained are therefore, under such circumstances, more uniform and dense than they might otherwise be.

It will now be apparent that all of the steps of our improved procedure in the manufacture of non-glare mirrors cooperate in both reducing the expense of such manufacture and in improving the uniformity and general quality of the product. For example: The initial testing of the optical characteristics of the glass base, before it is subjected to any cleaning and coating operations, eliminates all the expense attendant upon the unnecessary and useless handling and treatment of unsuitable pieces of glass which would be rejected as "dual image" mirrors after finishing; and since this preliminary optical examination of the reflection from two uncoated surfaces of the glass is also a more rigorous and critical one than any corresponding test of the finished mirror—because in the one case the intensities of the two contrasted front and rear surface images are substantially equal whereas in the other case these intensities are quite different—this step in the procedure tends to raise the standard of acceptable quality and thereby improve the uniformity and perfection of the final product. The limitation of the cleaning and coating actions to one surface only of the selected plates—as contradistinguished from ordinary operations of cleaning and coating both sides and then removing the coat from one of these sides—also greatly reduces the cost of these operations and further diminishes the danger of loss by rejections that may be necessitated by an injury to the mirror side during the process of stripping or cleaning the other coated side. This last named advantage is a particularly important one in making our improved non-glare mirrors, because the metallic sulphide film, which we employ as a reflective coating, adheres very tenaciously to the glass and can only be removed with great difficulty—and with the aid of strong acids—thus greatly increasing the chances of damaging the mirror surface in such an operation. And the modification of our previously described mixture, by the addition of alcohol thereto, results also in a very substantial reduction in the cost of material—to about 40% of that of a mixture in which chemically pure thiourea is used—substantially reduces the cost in manufacture and handling of the glass plates during the cleaning and coating operations; and secures greater certainty of always obtaining the necessary uniformity and thickness of coat in cases where the cleaning of the glass is not perfect.

We have described above the best mode now known to us for utilizing the principles of our present invention; but we do not desire to limit ourselves to the exact details hereinbefore set forth, because we have found that we can, in some cases, replace lead acetate with soluble salts of various other metals, such, for example, as antimony, cobalt or thallium, whose sulphides possess the requisite properties of selective absorption and reflection, and can also employ sulphur compounds other than thiourea for precipitating these sulphides in the form of the required mirror coatings. But with the preceding disclosures as a guide those skilled in this art can now easily vary the proportions of the several constituents of our improved coating solutions, and other details of our preferred procedure, as may be required for best meeting special conditions.

What we claim is:

1. The herein described operation of producing a light absorbing non-glare mirror, which consists in subjecting one surface of a glass sheet to a treatment adapted to remove all grease and other foreign matter therefrom, and then exposing the said treated surface to the action of a mixed solution of a metallic salt, an alkali thiourea, and ethyl alcohol, to thereby deposit thereon a dense uniform lustrous coat of metallic sulphide.

2. The process of forming non-glare mirrors which consists in cleaning only one side of a glass plate and then subjecting this side only to the action of mixed solutions of a lead salt, an alkali, and thiourea with a substantial volume of grain alcohol, and thereby depositing thereon a uniform strongly adherent coat of lead sulphide.

3. The herein described improvement in the manufacture of non-glare mirrors which comprises the preparation of a mixed solution of a metallic salt, an alkali, and thiourea with a substantial percentage of ethyl alcohol, and the exposure of one surface only of a warmed glass plate to the said mixture, whereby the said surface is uniformly coated with a dense adherent film of chemically deposited metal sulphide.

4. An improvement in the art of mirror manufacture which comprises the mixing of aqueous solutions of a lead salt, an alkali and thiourea with a substantial quantity of ethyl alcohol, subjecting one side only of a warmed glass plate to the action of this mixture, and continuing this exposure until the said side has been covered with a dense uniformly deposited absorbing coating of chemically precipitated lead sulphide.

5. An improvement in the manufacture of non-glare mirrors which comprises the mixing of aqueous solutions of lead acetate, sodium hydroxide and the thiourea with ethyl alcohol in the herein described proportions, exposing one surface only of a warmed glass plate to the action of this mixture, and continuing this action until substantially all of the lead has been converted into lead sulphide and deposited on the said surface in a dense uniformly distributed absorbing film.

6. The herein described improvement in the manufacture of lead sulphide mirrors which comprises the preparation of a solution containing approximately one part of lead acetate, one and one-half parts of sodium hydroxide, two parts of thiourea and 10 to 30 parts of ethyl alcohol in one hundred and forty-four parts of water, covering one surface of a transparent plate with the said mixture, and retaining it in contact therewith until the lead acetate has been converted into lead sulphide and deposited on the said surface in a dense uniform coating.

In testimony whereof, we have hereunto set our names this 28th day of April, 1927.

GEORGE FIELDING COLBERT.
WILLIAM HARRY COLBERT.